United States Patent [19]

Mehta et al.

[11] Patent Number: 5,252,378

[45] Date of Patent: Oct. 12, 1993

[54] METHOD OF PRODUCING DECORATIVE SHEETS HAVING LOCALIZED PATTERNS OF COLOR, DECORATIVE SHEETS PRODUCED BY SUCH METHOD, AND LAMINATES EMPLOYING SUCH DECORATIVE SHEETS

[75] Inventors: Mahendra Mehta, Pittsfield; William M. Stanard, Sheffield; Richard D. Brownhill, Lee, all of Mass.

[73] Assignee: The Mead Corporation, Dayton, Ohio

[21] Appl. No.: 882,508

[22] Filed: May 13, 1992

[51] Int. Cl.⁵ .............................................. B32B 9/06
[52] U.S. Cl. .................................. 428/195; 428/204; 428/206; 428/207; 428/915; 428/215; 428/913.3; 156/79
[58] Field of Search ............ 428/913.3, 204, 206, 428/207, 215, 195

[56] References Cited

U.S. PATENT DOCUMENTS

| | | | |
|---|---|---|---|
| Re. 30,233 | 3/1980 | Lane et al. | 428/207 |
| 3,125,484 | 3/1964 | Weiss | 161/6 |
| 3,135,643 | 6/1964 | Michl | 161/79 |
| 3,223,579 | 12/1965 | Dorland et al. | 162/123 |
| 3,373,070 | 3/1968 | Fuerst | 161/79 |
| 3,373,071 | 3/1968 | Fuerst | 161/79 |
| 3,451,878 | 6/1969 | Fung et al. | 161/5 |
| 3,718,536 | 2/1973 | Downs et al. | 161/168 |
| 3,940,538 | 1/1976 | Palazzolo et al. | 428/318 |
| 4,044,185 | 8/1977 | McCaskey, Jr. et al. | 428/153 |
| 4,154,882 | 5/1979 | Ungar et al. | 428/165 |
| 4,219,598 | 8/1980 | Noma et al. | 428/203 |
| 4,278,483 | 7/1981 | Mansolillo | 156/79 |
| 4,305,987 | 12/1981 | Scher et al. | 428/148 |
| 4,322,468 | 3/1982 | Raghava | 428/204 |
| 4,327,141 | 4/1982 | Scher et al. | 428/148 |
| 4,460,655 | 7/1984 | Jacobson | 428/530 |
| 4,476,193 | 10/1984 | Seidel et al. | 428/531 |
| 4,505,974 | 3/1985 | Hosler | 428/329 |
| 4,567,087 | 1/1986 | O'Dell et al. | 428/211 |
| 4,689,102 | 8/1987 | Prawdzik et al. | 156/235 |
| 4,816,314 | 3/1989 | Prawdzik et al. | 156/235 |
| 4,880,689 | 11/1989 | Park et al. | 428/143 |
| 4,888,220 | 12/1989 | Mehta | 428/15 |
| 4,971,855 | 11/1990 | Lex et al. | 428/206 |

FOREIGN PATENT DOCUMENTS 987217 4/1976 Canada .
990632 6/1976 Canada .

Primary Examiner—Patrick J. Ryan
Assistant Examiner—Abraham Bahta
Attorney, Agent, or Firm—Thompson, Hine and Flory

[57] ABSTRACT

A process for producing a decorative sheet having the appearance of localized single or multi-colored patterns comprising: adding to a furnish of fibrous material in an aqueous dispersing medium about 0.1 to 25%, based on the weight of the fibers, of wax-encapsulated pigment beads containing numerous individual pigment particles of one or more colors, the beads having a particle size of about 0.1 to 2.0 millimeters; removing the aqueous dispersing medium from the furnish to form a fibrous sheet having the wax-encapsulated pigment beads dispersed therein; and heating the sheet to a temperature sufficient to at least partially melt the wax from the pigment beads, the pigment beads exhibiting random patterns of one or more distinct colors and intensity extending from the upper surface of the sheet to the bottom surface of the sheet; the decorative sheet formed by the method; and decorative laminates employing the decorative sheet are described.

7 Claims, 1 Drawing Sheet

METHOD OF PRODUCING DECORATIVE SHEETS HAVING LOCALIZED PATTERNS OF COLOR, DECORATIVE SHEETS PRODUCED BY SUCH METHOD, AND LAMINATES EMPLOYING SUCH DECORATIVE SHEETS

FIELD OF THE INVENTION

This application relates to decorative sheets and, more particularly, to a method for making decorative sheets having localized patterns of specific color and intensity for use in decorative laminates.

BACKGROUND OF THE INVENTION

High-pressure decorative laminates are laminated articles comprising plural layers of synthetic resin impregnated paper sheets consolidated or bonded together into a unitary structure under high heat and pressure. Conventionally, the decorative or print layer is a sheet of high quality cellulose fiber and fillers impregnated with a thermosetting condensation resin such as melamine-formaldehyde resin. The decorative sheet may be overlaid with a low basis weight transparent sheet, which is also a sheet of cellulose impregnated with melamine-formaldehyde resin. These sheets are bonded to a plurality of core or body sheets of a fibrous cellulosic material, usually unbleached kraft paper, impregnated with a thermosetting resin such as phenolformaldehyde resin. Typically, up to seven or eight or more core sheets are consolidated with a single decorative sheet and a single overlay sheet to form a decorative laminate.

Decorative laminates are widely employed in the building industry for use as counter tops, kitchen and bathroom work surfaces, wall panelings, floors, cabinets, partitions and doors. Because they are generally more durable than wood and provide an attractive appearance, decorative laminates are also popular in the furniture industry, primarily as tops for furniture such as tables and desks.

The extensive use of these decorative laminates is primarily due to their low cost, impact and abrasion resistance, durability, clarity, and their resistance to heat, ultraviolet light and mild chemicals.

Decorative laminates are conventionally made of a core or body comprising a plurality of sheets of a fibrous material such as kraft paper which can be impregnated with a thermosetting resin. A decorative sheet also known as a decor sheet is usually mounted on top of the core to hide or disguise the underlying core. The decor sheet typically comprises a fibrous sheet having either a design printed on it or it may be dyed or have pigments dispersed therethrough to provide a solid color decorative sheet.

In the preparation of solid color decorative sheets, the colorant or pigment is added to the pulp prior to forming the sheet on the paper making machine. This method has been limited to producing decorative sheets which have a uniformly solid color. If a decorative design, pattern or a kaleidoscope effect were desired on either a clear or colored decorative sheet, a separate printing process with a printing cylinder or plate specially made for each color and intensity was required. The resulting pattern is then present only as a thin surface layer which is easily abraded away.

Thus, it would be desirable to have a decorative sheet for use in decorative laminates which not only economically provides a decorative color but also a sheet in which multicolored patterns are created within the sheet, i.e., interspersed among the fibers to improve its appearance of localized single or multicolored patterns characteristics. The present invention provides such a decorative sheet, a method for preparing such decorative sheet, and a decorative laminate using such decorative sheet.

SUMMARY OF THE INVENTION

The present invention relates to a decorative sheet having localized areas of color in random patterns with specific color (or colors) and intensity wherein the colors are incorporated in the fibers forming the decor sheet as contrasted with simply being printed thereon.

The decorative sheet of this invention contains beads of agglomerated, wax-encapsulated pigment interspersed among the fibers. The agglomerates may contain wax-encapsulated pigments of one or more colors depending on the effect desired. In those cases where multi-colored patterns are desired in the decorative sheet, agglomerates of various colored pigment may be employed with good success.

The beads of agglomerated wax-encapsulated pigment are added directly to the fiber furnish during the paper making process. This is an important aspect of the present invention because the pigment becomes interspersed among the fibers to provide the localized single or multicolored patterns. The paper making process involves dispersing a fibrous material, preferably bleached, in an aqueous dispersing medium; refining the fiber so that they have the desired characteristics, such as proper length and surface area; co-mixing the beads of agglomerated pigment and other additives which might be necessary; and forming a web of fibrous material containing the agglomerated pigment uniformly dispersed throughout the web. The agglomerates employed in carrying out this invention contain thousands of pigment particles, and it is important that the agglomerate remain intact and not break apart during the paper making process. If the agglomerate does not retain its integrity, the pigment particles will migrate and become mixed to the point that a uniform color with little or no definition is obtained instead of the localized single or multicolored patterns which are desired.

During the drying step, the resin binder melts and partially flows into the fibrous matrix forming a random pattern of color in the paper. This random pattern of color extends from the top surface of the paper to the bottom surface of the paper resulting in even more interesting three dimensional effects. This is particularly evident when the paper is resin saturated and used in the decorative layer of a plastic laminate. Since the colored pattern is distributed throughout the sheet and not simply on the surface of the sheet, the colored patterns will not abrade away during use as long as the sheet is present and intact.

The decorative sheet of this invention may be employed as a single top sheet for a decorative laminate or the decorative sheet may be laminated with one or more other decorative sheets to provide a multi-layered decorative sheet for the laminate.

DETAILED DESCRIPTION OF THE INVENTION

Figure 1:
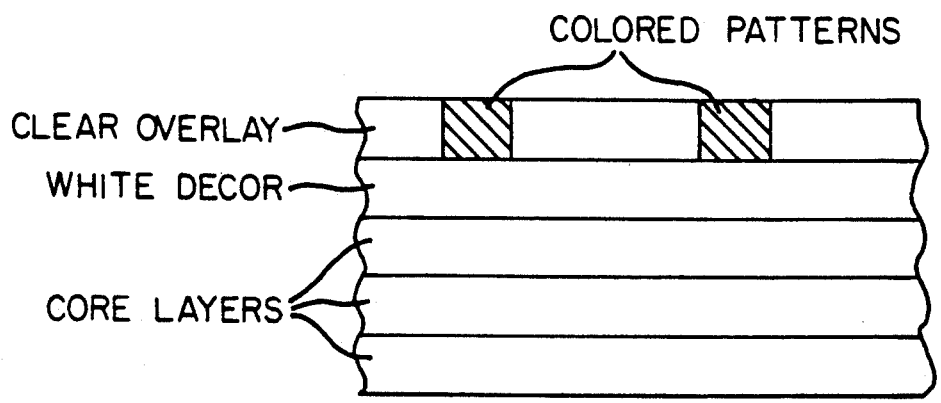
FIG. 1 is a diagrammatic, greatly enlarged elevation section through a decorative multi-layer laminate of this invention.
Figure 2:
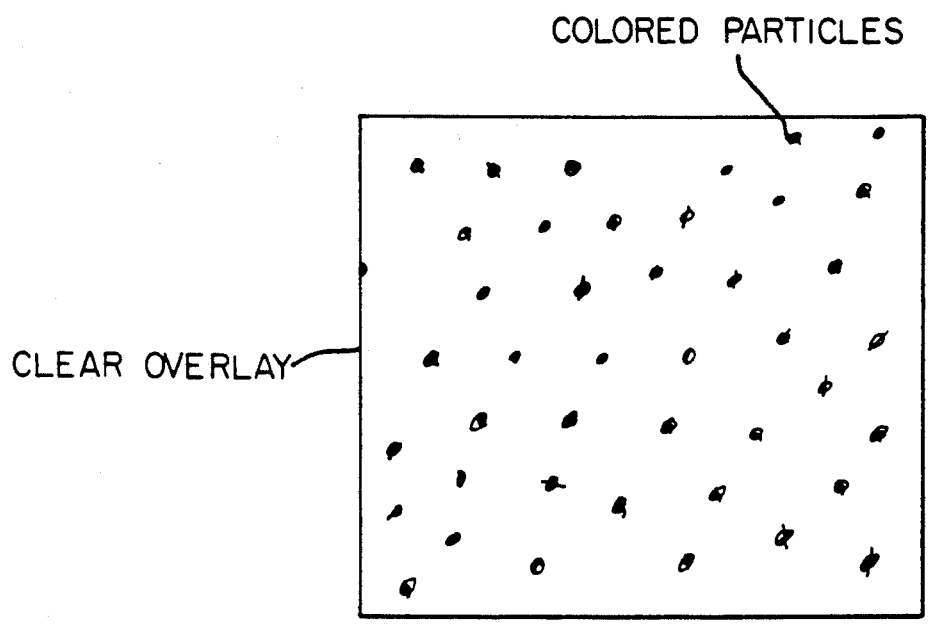
FIG. 2 is a top view of a decor sheet showing the decorative features of a decor sheet in accordance with the invention.

It is an object of the present invention to provide a decorative sheet having localized single or multicolored patterns interspersed among the fibers forming the decorative sheet. The localized single or multicolored patterns are formed during the papermaking process and not by a printing process.

It is another object of the present invention to provide a process for making a decorative sheet having localized patterns of color distributed within the sheet as contrasted with being printed on the surface of the sheet.

It is yet another object of the present invention to provide a decorative laminate using at least one decorative sheet as the top layer of the laminate wherein the decorative sheet has localized patterns of color distributed within the sheet (the term "localized" as used herein means that the color or colors occupy distinct areas in the sheet and do not form a uniform color continuously throughout the sheet).

A typical furnish includes fibers, water, wax encapsulated pigment beads, and conventional additives such as wet strength resins. The furnish preferably has a consistency of about 1 to 10%. The amount of wax encapsulated pigment beads added to the dispersed fiber can be up to about 40% and, preferably, about 0.1 to 25% based on the amount of fiber. However, the exact amount of pigment beads will depend in part on the nature of the fiber. The size of the wax encapsulated pigment beads is preferably in the range of about 0.05 to 2.0 millimeters to provide the desired color and color separation. A particular advantage of the present invention, when more than a single color is used, is that uniform and distinctive localized patterns are obtained without blending or running together of the various colors.

Other additives which may be employed in the furnish include wet strength resins such as melamine formaldehyde resin (in about 0.1 to 3%), and non-opacifying fillers such as clay, talc, silica, alumina, etc. in amounts up to about 75% based on the amount of fiber.

The dispersing medium employed in this invention is an aqueous medium although it is theoretically possible to use any liquid which is not a solvent for the wax.

The decor sheets of the present invention can be made by the following procedure. The furnish is deposited on a continuous screen where the water is removed as part of the standard papermaking process by a combination of filtration on the screen, pressing the web against an absorbant felt material, and contacting the web with a heated roller and/or by passing the web through heated air, microwaves or infrared radiation. The basis weight of the decorative paper of this invention is used at about 12 to 200 pounds/3000 sq. ft. and preferably about 40 to 75 pounds/3000 sq. ft.

The waxy material used for encapsulating the pigment can be any solid waxy material having a melting point in the range of about 200 to 300° F.

The pigment particles employed in the present invention can be of any color desired. A particularly useful encapsulated pigment is Holcobatch yellow-spheres obtained commercially from Holland Colors America, Inc. Other pigments include wax encapsulated blue, red, black, etc. as single or mixed pigments.

The laminating resins employed in the present invention are those commonly used to laminate core sheets to form a unitary core and includes melamine-formaldehyde, ureaformaldehyde, polyester, epoxy, etc.

The preferred resin for laminating the decorative sheets is melamine-formaldehyde.

The fibrous materials used in this invention to provide the decorative web are those successfully employed in the preparation of decorative sheets. For example, fibrous materials such as cellulose, rayon, polyester, acrylic, nylon, glass, ceramic or any other natural or man-made fiber or combinations thereof. Preferably, the fiber is a cellulosic fiber obtained from a mixture of bleached hardwood kraft pulp, bleached softwood kraft pulp or cotton linter pulp.

The following example is given to illustrate the present invention more specifically. It will be understood, however, that applicants are not limited to the specific procedures and products shown in this specific example.

EXAMPLE

To a dispersed mixture of 75% bleached hardwood kraft pulp and 25% bleached softwood kraft pulp was added 1% Holcobatch yellow spheres and 1% melamine formaldehyde wet strength resin. This slurry was formed into a lab handsheet which was saturated with melamine-formaldehyde laminating resin and cured to the B stage. It was then placed over a standard melamine-formaldehyde treated white decor sheet and six layers of standard phenolic treated core stock and laminated at 1000 psi and 300 deg. F. The resulting decorative laminate had yellow circles that stood out three-dimensionally from the white background.

Having described the invention in detail and by reference to preferred embodiments thereof, it will be apparent that modifications and variations are possible without departing from the scope of the invention defined in the appended claims.

What is claimed is:

1. A decorative sheet exhibiting 3-dimensionally, localized patterns of color and intensity comprising a sheet of fibrous material, said sheet containing about 0.1 to 25%, based on the weight of said fiber, of wax-encapsulated pigment beads of one or more distinct colors interspersed among said fibers, said beads having a particle size of about 0.05 to 2.0 millimeters, said decorative patterns extending from the top of said sheet to the bottom of said sheet.

2. The decorative sheet of claim 1 wherein said fibrous material is cellulose, rayon, polyester, acrylic, nylon, glass, ceramic, or combinations thereof.

3. The decorative sheet of claim 2 wherein said fibrous material is bleached cellulosic fibers.

4. A decorative laminate exhibiting 3-dimensional, localized patterns of color and intensity comprising a plurality of fibrous sheets wherein at least one of said sheets is a decorative sheet containing about 0.1 to 25%, by weight of said fibers, of wax-encapsulated pigment beads of one or more colors, said pigment beads having a particle size of about 0.05 to 2.0 millimeters.

5. The decorative laminate of claim 4 wherein said plurality of fibrous sheets comprises one or more core sheets formed from unbleached cellulosic fiber, said core sheets being impregnated with a laminating resin.

6. The decorative laminate of claim 5 wherein said laminating resin is a thermosetting resin selected from the group consisting of phenolic, melamine-formaldehyde, urea-formaldehyde, and polyester resins.

7. A decorative laminate exhibiting 3-dimensional, localized patterns of color and intensity comprising:
() a clear decorative sheet obtained from bleached cellulosic fiber, said decorative sheet containing about 1%, based on the weight of said fibers, of wax-encapsulated pigment beads of one or more distinct color interspersed among said fibers, said beads having a particle size of about 0.05 to 2.0 millimeters;
(b) an opaque decorative sheet impregnated with melamine-formaldehyde resin; and
(c) a plurality of phenolic resin impregnated core sheets.

* * * * *